United States Patent [19]

Leas

[11] 4,007,108
[45] Feb. 8, 1977

[54] CONVERTING SOLID FUELS TO GASEOUS AND LIQUID FUELS

[76] Inventor: Arnold Marcel Leas, P.O. Box 429, Columbia City, Ind. 46725

[22] Filed: June 2, 1975

[21] Appl. No.: 583,336

[52] U.S. Cl. .................................................. 208/10
[51] Int. Cl.² ........................................ G10G 1/08
[58] Field of Search ...................................... 208/10

[56] References Cited

UNITED STATES PATENTS

| | | | |
|---|---|---|---|
| 3,030,297 | 4/1962 | Schroeder | 208/10 |
| 3,162,594 | 12/1964 | Gorin | 208/10 |
| 3,247,092 | 4/1966 | Huntington | 208/10 |
| 3,755,137 | 8/1973 | Schuman | 208/10 |
| 3,779,893 | 12/1973 | Leas et al. | 208/10 |
| 3,926,775 | 12/1975 | Schroeder | 208/10 |
| 3,944,480 | 3/1976 | Schroeder | 208/10 |
| 3,960,701 | 6/1976 | Schroeder | 208/10 |

*Primary Examiner*—Herbert Levine
*Assistant Examiner*—James W. Hellwege
*Attorney, Agent, or Firm*—Edward E. Dyson; John J. Byrne

[57] ABSTRACT

A method for the production of desulfurized liquid and gaseous fuels from coal utilizing a cobalt catalyst.

13 Claims, 2 Drawing Figures

CONVERTING SOLID FUELS TO GASEOUS AND LIQUID FUELS

This invention relates to the production of liquid and gaseous fuels. More particularly, this invention relates to the production of desulfurized liquid and gaseous fuels from coal.

It is desirable from an economic standpoint to utilize raw coal as a source of both liquid and gaseous fuels since coal is a relatively inexpensive fuel source compared to petroleum crude oil and is quite abundant in contrast to the rapidly dwindling supplies of petroleum and natural gas resources. However, prior art apparatus for recovering liquids and gases from coal are quite complicated and inefficient, resulting in an operations cost which is not commensurate with the values of fuels obtained from the raw coal. Further, the use of coal has been depressed, due to the substantial amounts of pollutants coal contains, primarily in the form of sulfur, requiring that the end products be subjected to such treatments as desulfurization prior to ultimate consumption.

It is an object of the present invention to provide a relatively simple and economically feasible process for recovering liquid and gaseous fuel values from coal.

It is a further object of the present invention to provide means for desulfurizing the liquid and gaseous fuel products recovered from coal prior to the consumption thereof.

It is a further object of the present invention to provide an integrated process wherein the liquid and gaseous fuel products are simultaneously recovered from the coal in a single reactor tower zoned for various stages of reaction and separation.

It is a further object of the present invention to provide an integrated process wherein the makeup requirements and catalyst losses are minimized.

It is a further object of the present invention to provide an integrated process for recovering liquid and gaseous fuel values from coal wherein the catalyst is continuously regenerated and recycled.

A further object of this invention in one of its alternate embodiments is to provide an improved process for the direct reduction of iron ore.

The present invention is related to the process described and claimed in U.S. Pat. No. 3,779,893, dated Dec. 18, 1973, entitled PRODUCTION OF DESULFURIZED LIQUIDS AND GASES FROM COAL.

More particularly raw, crushed coal, generally having a size on the order of from about 0.001 to about 0.25 in. is fed to lock bin admixed with cobalt tetroxide catalyst, generally from about 0.01 to about 0.15 lbs. of catalyst utilized per pound of coal. The cobalt catalyst may be used in pellet form on such carriers as alumina and calcium oxide. The coal-catalyst admixture is fed to a coal-oil extractor tower with the temperature maintained generally on the order of from about 500° to about 900° F for a time sufficient to extract oils and gaseous materials from the coal, and to partially hydrogenate the products via hydrogen introduced into the extractor. The hydrogen initially may be admitted from a source external to the system; thereafter, hydrogen produced within the system may be used, with minimal makeup required.

Producer gas and vaporized gasoline fractions are removed to a cobalt treater where the products are desulfurized and removed to a fractionator for separation and removal from the system as products.

The partially hydrogenated coal-oil and catalyst are removed to a high pressure coal-oil hydrogenator, operated at pressures on the order of from about 500 to about 5,000 psig. Initially, hydrogen from an external source is utilized. After the system is placed in continuous operation, recycled hydrogen, together with makeup hydrogen as required, may be advantageously employed.

Following hydrogenation, the hydrogenated oil, spent catalyst and ash are moved to a coal reactor and admixed with hot sand, generally at a temperature of from about 800° to about 1,600° F. The sand and coal mix, heavy oil is cracked and the lighter oils vaporize in the upper zone of the reactor, with upflowing producer gas carrying the combined vapors back to the coal extractor. Generally, the residence time within the coal reactor is kept within from about 5 to about 50 minutes. The carbon-coated sand and catalyst pass into a median zone within the reactor by gravity flow wherein the carbon is gasified to primarily carbon monoxide by air or oxygen admitted to the median zone. The ash and catalyst and removed to a separator where nitrogen gas is employed to selectively fluidize the fine ash out of the system. The heavy catalyst and fine catalyst is then recycled to the coal extractor.

In the coal reactor the sand carries most of the residual carbon into the lowermost zone when oxygen fed into the zone converts residual carbon dioxide and carbon to carbon monoxide. Cobalt tetroxide pellets fed into the lowermost zone serves to react with carbon monoxide to yield carbon dioxide, the carbon monoxide resulting from the reaction of oxygen with carbon and carbon dioxide with carbon. Steam admitted to this zone serves to react with residual carbon to produce carbon monoxide and to pressure the spent cobalt catalyst and sand to separators where sand is separated and returned to the reactor feed and the spent cobalt is removed to lockbins where air is employed to regenerate the cobalt metal cobalt oxide.

The hot producer gas exiting from the middle zone of the reactor is desulfurized in a cobalt treater where the hydrogen sulfide present reacts with cobalt oxide to produce cobalt sulfide. In a succeeding cycle, steam and minute amounts of air are introduced to regenerate cobalt oxide and to form elemental sulfur which is removed from the system. A portion of the producer gas is removed to a hydrogen generator which reaction with injected steam produces hydrogen for use in the system. Carbon dioxide produced in the hydrogen generator is recycled to the coal reactor to function in the conversion of carbon to carbon monoxide.

Such process permits the maximum use of products produced in the system with a minimum of makeup reactants required to perform the process successfully once the process is set into operation on a continuous, cyclic basis. Additionally, the products are obtained without discharging pollutants to the atmosphere.

In a modification of the above process, iron ore replaces the circulatory sand, cobalt oxidizer and the cobalt catalyst, whereby the process is utilized to directly reduce iron ore.

Figure 1:
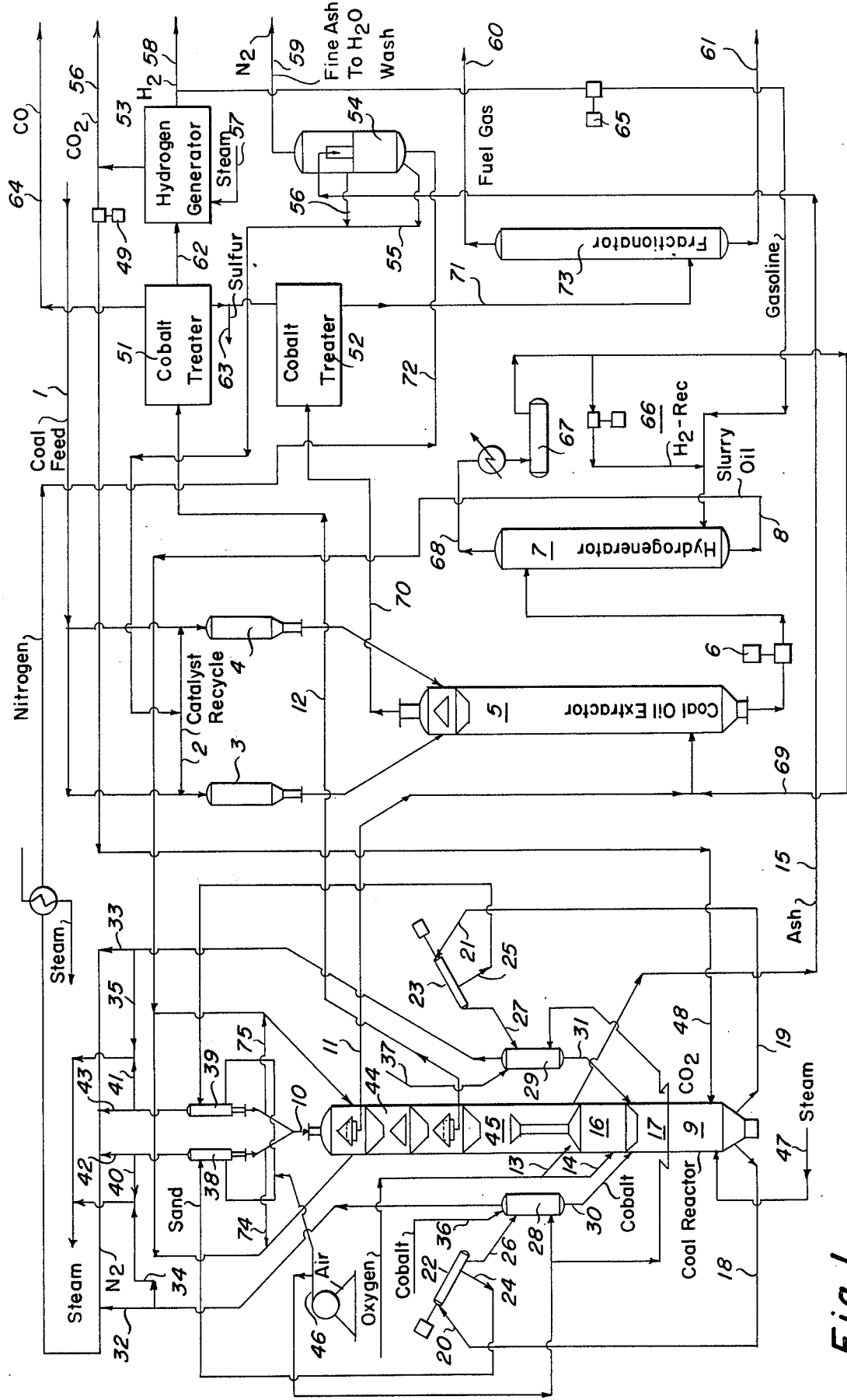
FIG. 1 is a diagrammatic illustration of the process of the invention.

In FIG. 1, raw, crushed coal 1 is fed into lockbins 3 and 4 and admixed with processing catalyst 2. The coal and catalyst are then fed into the coal-oil extractor tower 5. Following extraction and hydrogenation within tower 5, the partially hydrogenated coal-oil slurry, catalyst and undissolved coal are removed from extractor 5 via line 6 to a high pressure coal-oil hydrogenator 7 operating at pressures on the order of from about 500 to about 5,000 psig. Hydrogen is supplied to the hydrogenator both by recycling the unused hydrogen removed from the hydrogenator 7 through line 68, recovery-storage 67 and line 66 with any makeup required provided via line 65 from a hydrogen generator 53.

Hydrogenated oil, spent catalyst and ash from hydrogenator 7 are pressured to the top of the coal reactor 9 via line 8. Hot recycle sand is admitted to the top of reactor 9 via line 10, mixes with the coal-oil feed, the heavy oil is cracked, generally at temperatures on the order of from about 1,000° to about 1,600° F and a residence time of from about 1 to about 10 minutes with the lighter oils vaporizing in top zone 44 and removed from the reactor 9 by upflowing producer gas via line 11 to the extractor 5 with hydrogen admitted via line 69. Producer gas and gasoline fractions are removed from extractor 5 via line 70 to a cobalt oxide treater 52. In cobalt treater 52 the cobalt oxide reacts with the sulfur materials and carbon monoxide to yield cobalt sulfide and carbon dioxide. Desulfurized gas and gasoline vapors are removed via line 71 to a fractionator 73 wherein separation is effected, with gasoline product removed via line 61 and full gas product removed via line 60.

In coal reactor 9, residual carbon coats the sand and catalyst surfaces as downward flow occurs and the carbon is gasified, primarily to carbon monoxide, in succeeding zones 45, 16 and 17, with decarbonation of ash and catalyst occurring principally in zone 45 by oxygen supplied thereto by line 13. Ash and catalyst are removed via line 15 to a separator 54 where nitrogen fed by line 72 selectively fluidizes fine ash from separator 54 via line 59 to a water-wash treater (not shown). The heavy catalyst is removed from separator 54 via line 55 and catalyst fines via line 56 to be recycled via header 2 to lock-bins 3 and 4.

In the coal reactor 9, sand and residual carbon flowing into zone 16 are treated with oxygen entering zone 16 via line 14 to further decarbonize the sand, and convert carbon dioxide to carbon monoxide. In the lowest zone, cobalt tetroxide is fed to zone 17 via lines 30 and 31 from lock-bins 28 and 29 with carbon dioxide and steam fed into zone 17 via lines 48 and 47 respectively. A portion of the steam reacts with carbon to form hydrogen and carbon monoxide with the remainder pressuring the cobalt and sand via lines 18 and 19 to separators 20 and 21. Rotating screens 22 and 23 within the separators permit the sand to flow through the screens through lines 24 and 25 to lock-bins 38 and 39. The courser cobalt material is then pressured to cobalt lock-bins 28 and 29 via lines 26 and 27. Air from 46 admitted to the lock-bins 28 and 29 oxidizes the cobalt to the tetroxide, and the cobalt is then recycled to the reactor 9 via lines 30 and 31. The nitrogen present in the air from 46 is released from lock-bins 28 and 29 via lines 32 and 33 with the lift steam released via lines 34 and 35. Additional air is fed to sand lock-bins 38 and 39 to burn off residual carbon, with the nitrogen and carbon dioxide formed released via lines 40 and 41.

In the middle of the coal reactor 9, the majority of the producer gas is removed via line 12 to a cobalt treater 51 wherein desulfurization occurs, the cobalt reacting with sulfur to form cobalt sulfide. A portion of the carbon monoxide is removed from the system via line 64. The balance of the desulfurized producer gas is removed to a hydrogen generator 53 via line 62. Steam admitted to the generator 53 via line 57 is converted to hydrogen therein with a portion of the hydrogen removed as product via line 58 and the remainder recycled via line 65 to the hydrogenator 7. Carbon dioxide produced in the generator 53 is removed, partially as product via line 50, with the remainder pressured via compressor 49 to the coal reactor 9 via line 48.

The cobalt sulfide in treaters 51 and 52 is reacted with steam and a minute amount of air, regenerating the cobalt oxide and producing elemental sulfur, which is removed from the system via line 63.

As can be readily appreciated, such system makes maximum use of each material introduced into or produced within the system with relatively low makeup requirements.

The following examples serve to illustrate the efficiency of the present process:

EXAMPLE 1

Coal at a rate of 9,250 lbs/day (dry weight) was treated in the system hereinbefore described under 120 psig, a sand circulation of 30,000 lbs/day a maximum reactor temperature of 1,910° F in the presence of a 38 weight percent cobalt catalyst on an alumina-calcium oxide support.

| Products (heat content of dry, deashed coal) | |
|---|---|
| Gasoline | 44.4 per cent |
| Fuel | 40.0 per cent |
| | 84.4 per cent |
| Carbon content ash | 0.9 per cent |
| Heat value fuel gas BTU/ft$^3$ | 440 |
| Heat value gasoline BTU/gal. | 124,000 |

EXAMPLE 2

Coal at a rate of 9,175 lbs/day was treated in the system hereinbefore described under a pressure of 120 psig in the reactor and 1,040 psig in the hydrogenator with a sand circulation of 32,000 lbs/day, a maximum reactor temperature of 1,875° F in the presence of a 38 weight percent cobalt catalyst on an alumina-calcium oxide support.

To better insure more uniform carbon coating of the circulating sand granules, some of the sand from the feed lockbins is pressured to the riser pipeline carrying the hydrogenated coal oil to the top of the coal reactor via lines 74 and 75.

Another application of the process of the present invention is to directly reduce iron ore. Now referring to FIG. 2, crushed coal is fed through conduit 101 and the crushed (one-hundredth inch or less) iron ore is fed through conduit 102 into the feed lock-bins 103 and 104. Recycled, regenerated catalyst is fed through conduit 105 into the lock-bins 103 and 104. Even though the iron ore contains oxygen, very little oxygen is released until the oxygen is needed in the bottom portion of the coal gasifier.

From the coal feed lock-bins 103 and 104 the solid mixture of coal iron ore, and catalyst is fed through conduits 106 and 107 to the coal-oil extractor tower 108 wherein the liquid oils are dissolved out of the coal. The recycle solvent oil is primarily diesel fuel. Further, hydrogen also promotes oil extraction. Some of the iron particles from iron sulfide function as a hydrogenating catalyst thereby releasing hydrogen sulfide, ammonia, and some steam flowing out the top of the extractor tower through line 109 into the cobalt treater 110. The treated and/or desulfurized fuel gas then is pressured through line 111 to the fractionator tower 112. The clean fuel gas exits from the top as a product through line 113, and the gasoline exits from the bottom as a product through line 114. The combined coal-oil-iron-ore-catalyst slurry is pumped to a high pressure hydrogenator tower 115 wherein hydrogen is added from lines 116 and 117 to hydrogenate more of the coal-oil.

The liquid-slurry-coal-iron-catalyst is pressured from the bottom through the riser pipe transfer line 118 to the second top tray of the coal reactor 119. A substantial portion of the circulating sand from the lock-bins 120 and 121 are also fed through riser 118 to improve cracking, oil vaporization, and uniform carbon coating of the sand granules. The balance of the circulating sand is pressured through lines 124 and 125 to the top filter tray 126 in the coal reactor. The fuel gas, vaporized gasoline and solvent diesel oil are pressured through the screened and perforated top filter 126 and then through line 127 to the bottom of the coal-oil extractor tower 108. More cracking and oil vaporization takes place in the top zone of the coal reactor.

When the mixed solid particles flow downward over the trays they are thoroughly dried of oily materials and therefore these particles function again at the middle conical filter as cleaning agents thereby permitting most of the producer gas to pass through the filter 128 and then through line 129 to the cobalt treater 130, and then through line 131 to the hydrogen generator 132. Some of the hydrogen is taken off as a product through line 133 and the balance is recycled to the process.

As the mixed solids in the coal reactor flow into the gasifier zones, the ash and catalyst are pressured into the annular ash accumulator 134 but the heavier sand and iron ore coated with most of the coke gravitates to the bottom gasifying zones 135 and 136. By now the oxygen within the iron ore particles reacts with the carbon monoxide and hydrogen recycle gases to yield considerable heat. To modify this heat release, recycled carbon dioxide from lines 137 and 138 assist in gasifying the carbon. The combined ash and catalyst recycle are withdrawn through line 139 to the classifier tower 140. The ash is blown with the flue gases ($N_2$ and $CO_2$) out to the water wash tower through conduit 141. The fine and course catalysts are then returned to the feed lock-bins through conduit 105.

In the bottom of coal reactor recycle hydrogen and the unconverted carbon monoxide are fed to complete the iron ore reduction and to heat-sinter the reduced iron product via lines 142, 143, and 144. Just following the cooling of the iron product, nitrogen and argon gases are pressured in through line 145 to inert the sintered reduced iron particles that then are discharged from lock-bins 146 and 147 through conduits 148 and 149. The excess hydrogen gas pressures the iron particles from the bottom of the coal reactor through conduits 150 and 151 to the separators 152 and 153 so that the sintered iron flows into the lock-bins 146 and 147 through lines 154 and 155, and the finer particles flow through the rotating screens and then through lines 156 and 157 into their lock-bins 120 and 121. The remainder of the process steps are very similar to that illustrated in the process of FIG. 1.

Figure 2:
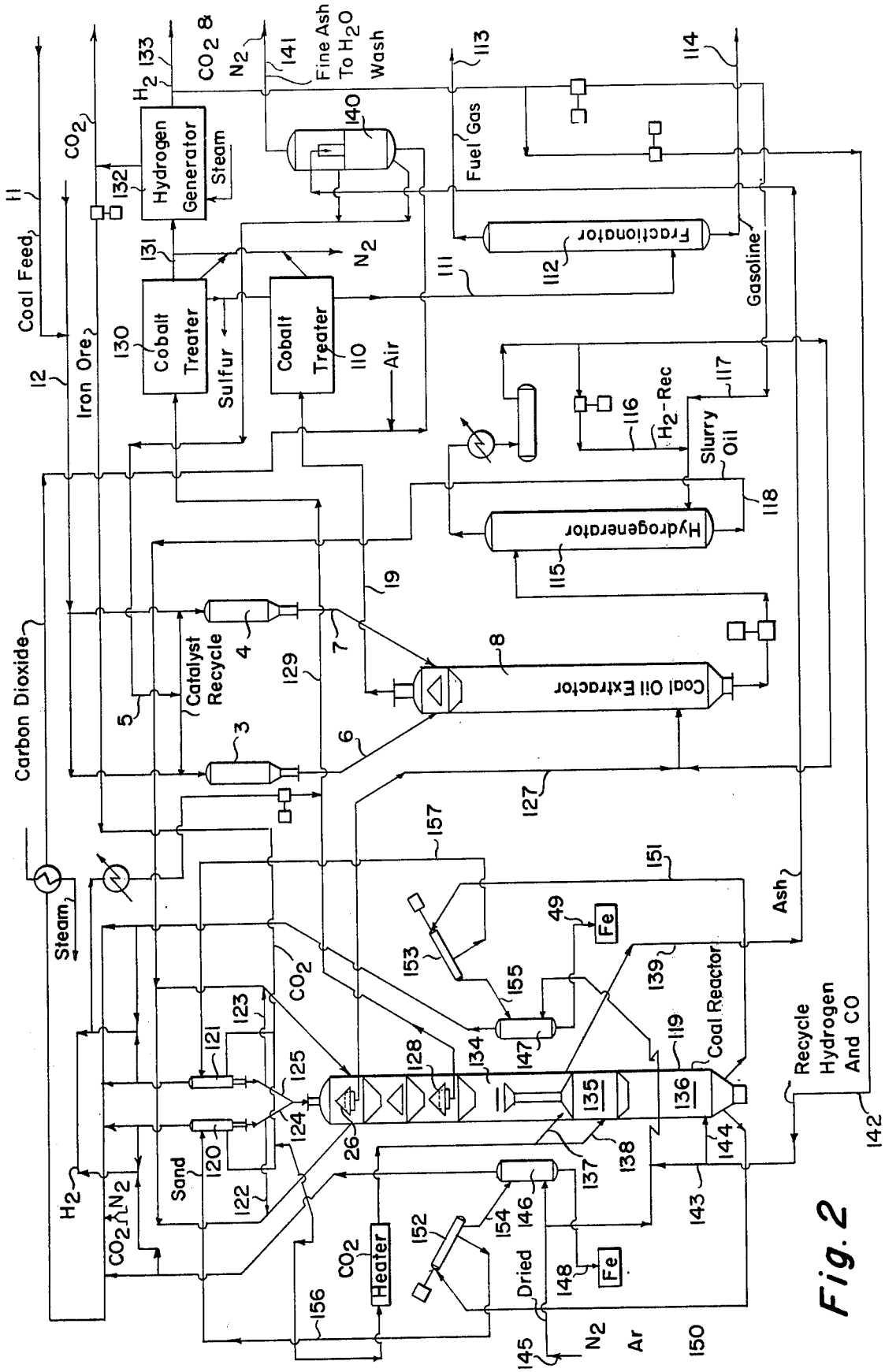
FIG. 2 is a diagrammatic illustration of an alternative form of the process of this invention.

In summary, the process of FIG. 2 differs from that of FIG. 1 in that the iron ore replaces a portion of the circulating sand, cobalt oxidizer, and the cobalt catalyst. Therefore the gangue from the iron ore functions as the circulating sand, the oxygen in the iron ore supplies the process oxygen and the iron sulfides to function as the catalyst. The recycle hydrogen that contains some unconverted carbon monoxide does most of the iron ore reduction while simultaneously gasifying the residual carbon from the coal.

An illustrative example of the foregoing process is as follows:

EXAMPLE 3 coal fees = 10,000 lbs./day
iron ore feed = 10,000 lbs./day
coal products expressed as heat content of dried and deashed coal:

|  | per cent coal heat |
|---|---|
| gasoline | 16.7 |
| fuel gas | 35.0 | iron before and after process:

| weight per cent | before | after |
|---|---|---|
| Fe | 45.5 | 95.0 |
| inerts | 35.0 | 1.0 |
| carbon | none | 1.9 |
| oxygen | 19.5 | 2.1 |

| Key operating conditions | |
|---|---|
| system pressure - psig | 120 |
| simulated sand rate - TPD | 17 |
| maximum reactor temperature | 1760° F |
| carbon content of ash | 0.75 per cent |
| fuel gas heat value BTU/cu. ft. | 648 |
| gasoline heat value BTU/gallon | 125,500 |
| sulfur removal on both coal and iron ore is virtually complete. | |

In a general manner, while there have been disclosed effective embodiments of the present invention, it is to be understood that the invention is not limited to such embodiments, and changes may be made therein without departing from the scope of the invention.

I claim:

1. A process for the production of liquid and gaseous fuels from coal which comprises
   admixing crushed coal with cobalt tetroxide catalyst;
   introducing said mixture into a coal-oil extractor with hydrogen;
   extracting liquids and gases from said coal while partially hydrogenating same at a temperature of from about 500° to about 900° F;
   removing gaseous and vaporized liquids, desulfurizing and recovering as products;

removing the coal, oil and catalyst to a high pressure hydrogenator and hydrogenating the mixture at pressures of from about 500 to about 5,000 psig;

removing the hydrogenated oil, coal ash and catalyst to a coal reactor having upper middle, and lower zones;

admixing therewith hot sand, at a temperature of from about 800° to about 1,600° F;

cracking said oils in the upper zone of said coal reactor as the admixture flows downward through said coal reactor;

removing vaporized light oils to the coal-oil extractor;

reacting carbon-coated sand coal ash and catalyst in the middle zone of said coal reactor with a source of oxygen to gasify carbon to primarily carbon monoxide;

removing decarbonized ash and catalyst to a separator, separating and removing said ash from the system and returning said catalyst to the coal extractor;

feeding cobalt tetroxide and steam to the lower zone of the coal reactor, converting residual carbon and carbon monoxide to carbon dioxide;

removing said sand and cobalt from the lower zone to a separator, regenerating cobalt metal with air, and returning said sand and cobalt tetroxide to the coal reactor in a cyclic, continuous process;

removing hot producer gas from the middle zone of the reactor, desulfurizing and recovering as product.

2. The process of claim 1 wherein the process is a continuous process.

3. The process of claim 1 wherein cobalt oxide is employed to desulfurize hot producer gas.

4. The process of claim 2 wherein cobalt oxide is regenerated following desulfurization by reaction with oxygen, and elemental sulfur is recovered.

5. The process of claim 3 wherein a portion of desulfurized gas is reacted with steam to produce hydrogen which is cycled to the hydrogenators.

6. The process of claim 1 wherein the hot sand is added to the hydrogenated coal-oil slurry at a point prior to the feeding of said coal-oil slurry to the top of the coal reactor to promote cleaning, cracking, more uniform carbon deposition upon the sand and vaporization of the oil.

7. A process for the production of liquid and gaseous fuels from coal which comprises admixing crushed coal with catalyst, extracting liquids and gases from said coal while partially hydrogenating same at a temperature of from about 500° to about 900° F, removing gaseous and vaporized liquid products, hydrogenating remaining coal, oil and catalyst under elevated pressures on the order of from about 500 to about 5,000 psig, gasifying the remaining carbon and cracking residual oil at a temperature of from about 800° to about 1,600° F in a coal reactor in the presence of hot circulating sand, steam and a source of oxygen, and recovering gaseous and vaporized liquid products therefrom.

8. The process of claim 7 wherein said catalyst is supported cobalt tetroxide.

9. The process of claim 7 wherein the source of oxygen in the coal reactor is cobalt tetroxide.

10. The process of claim 9 wherein reduced cobalt is removed from said coal reactor, regenerated with oxygen and recycled to said coal reactor.

11. The process of claim 7 wherein the source of oxygen in the coal reactor is iron ore.

12. The process of claim 11 wherein the iron ore is admixed with coal and oil prior to the extraction stage.

13. The process of claim 11 wherein reduction of iron ore, carbon gasification and oil cracking in the coal reactor is conducted in the presence of hot circulating sand.

* * * * *